Sept. 9, 1952 T. B. CHAMBERS, JR 2,609,950
HAND TRUCK
Filed July 10, 1948 3 Sheets-Sheet 1
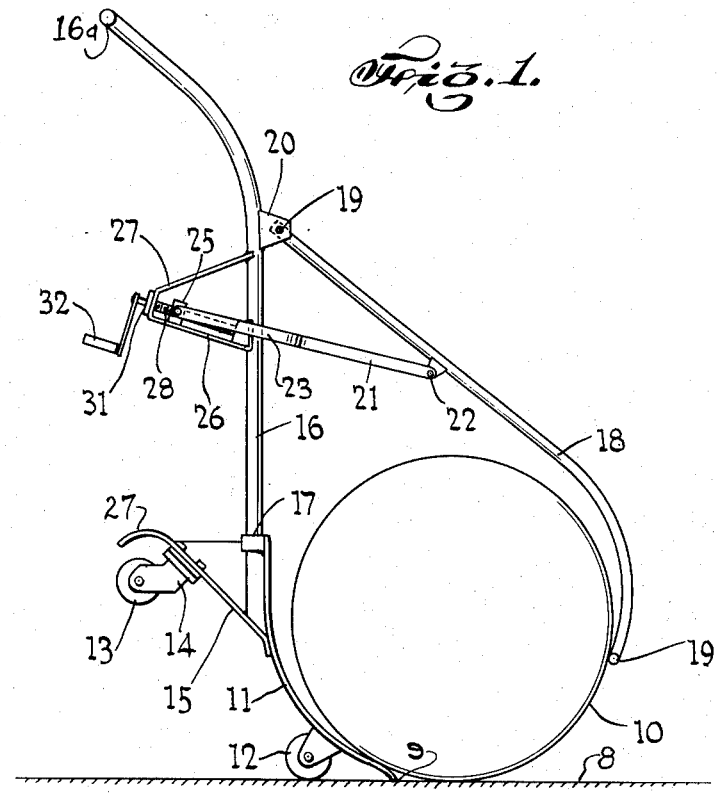
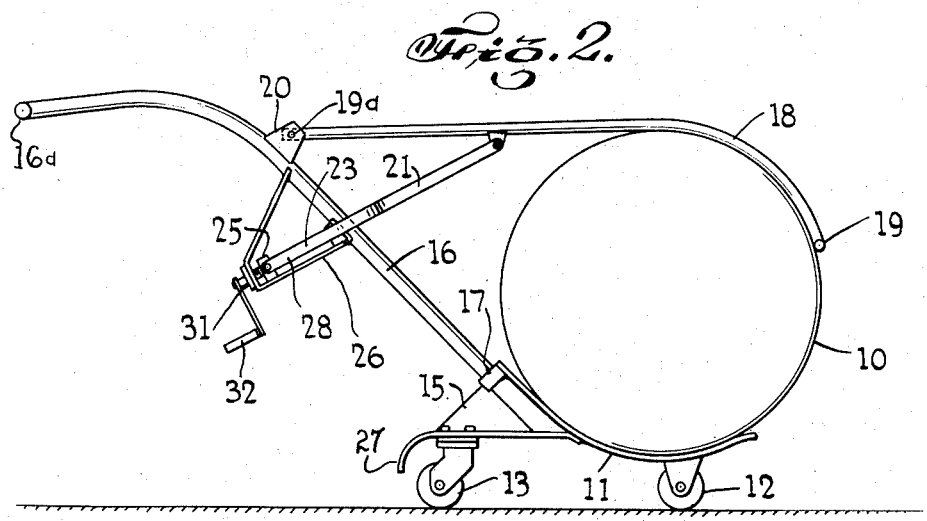
INVENTOR.
THOMAS B. CHAMBERS JR.
BY
Hammond & Littell
ATTORNEYS Sept. 9, 1952      T. B. CHAMBERS, JR      2,609,950
HAND TRUCK
Filed July 10, 1948      3 Sheets-Sheet 2
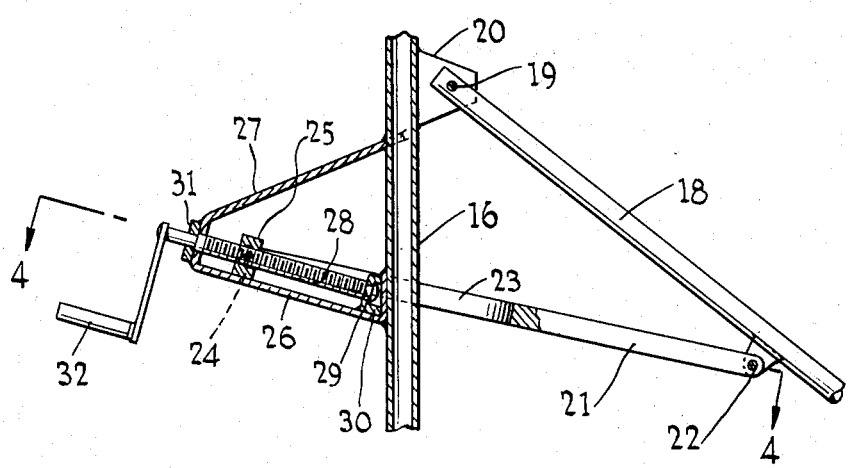
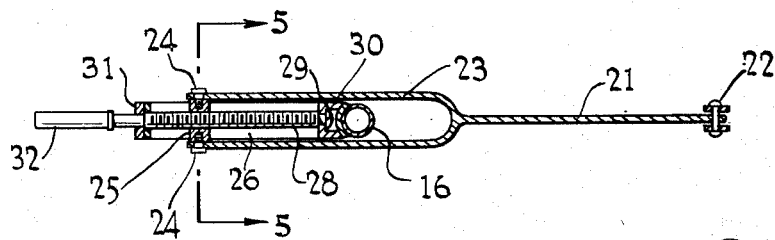
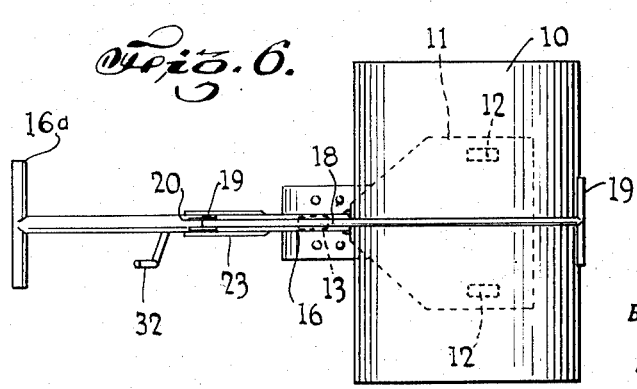
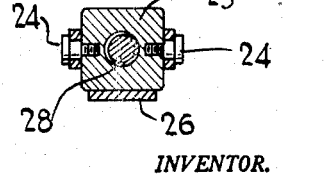
INVENTOR.
THOMAS B. CHAMBERS JR.
BY
Hammond & Littell
ATTORNEYS

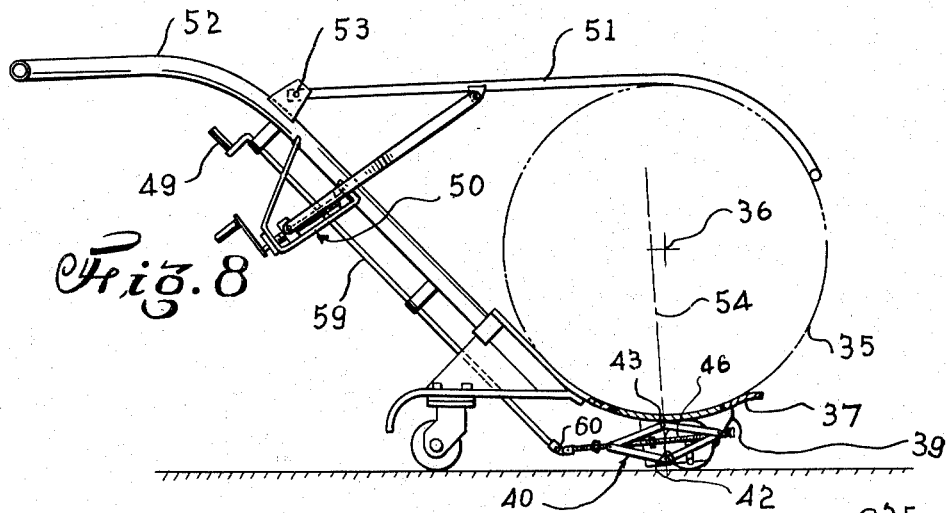
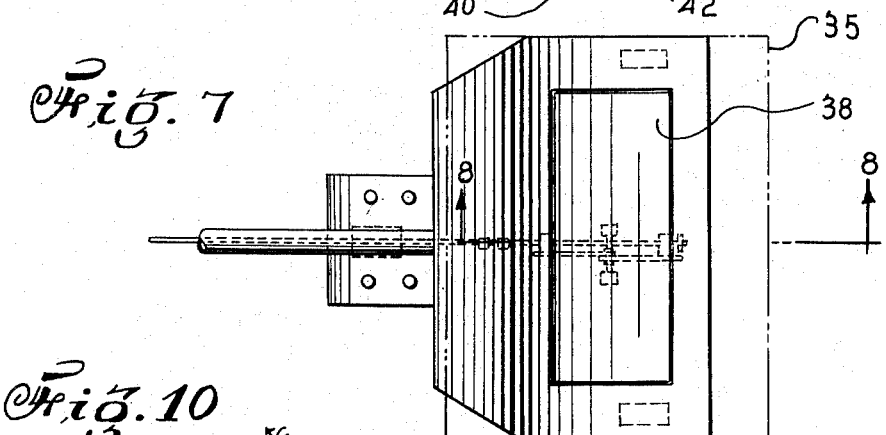
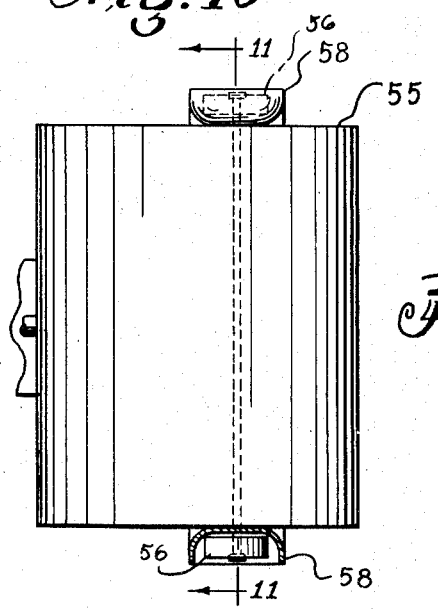
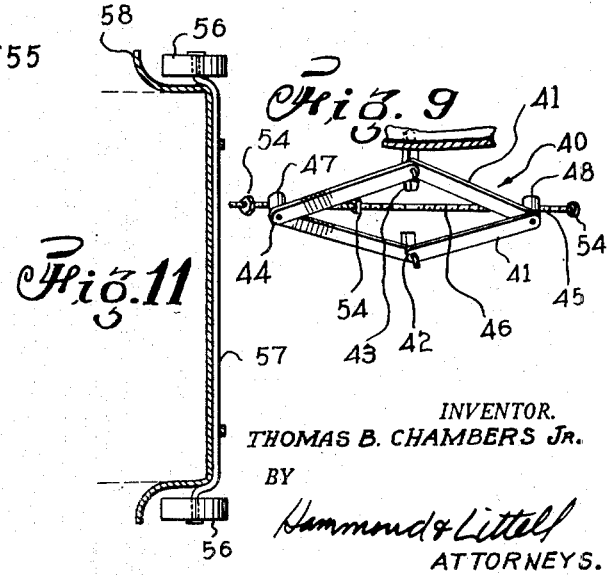

Patented Sept. 9, 1952

2,609,950

UNITED STATES PATENT OFFICE 2,609,950

HAND TRUCK

Thomas B. Chambers, Jr., Cranford, N. J.

Application July 10, 1948, Serial No. 38,035

8 Claims. (Cl. 214—65.4)

This invention relates to an improved hand truck or similar material handling device, particularly one adapted to pick up and move cylindrical articles, such as rolls, barrels, etc., which frequently are heavy and difficult to handle by ordinary means.

In the transportation of the articles mentioned, it is desirable that the truck be arranged so that the operator thereof can by means of the truck, transfer or load an article from the floor or surface upon which the article rests on to the truck with the minimum of effort. The truck must be arranged so that articles of various sizes may be transported thereby, and so that articles of shapes, other than cylindrical, may be accommodated. Often, the articles to be handled may be easily damaged so that the truck and handling means thereon must be arranged to load and move the articles without injury.

One of the objects of the invention is to provide an improved hand truck for transporting articles.

Another object of the invention is to provide an improved hand truck loading apparatus for assisting in the transfer of an article from a surface on to the hand truck.

A truck made in accordance with the invention has a cradle or platform for receiving the article to be transported, said cradle having wheels associated therewith. A handle is associated with the cradle and means mounted on said truck selectively movable to contact an article so as to assist in placing and holding said article on the truck cradle.

One of the features of the invention is the provision of an article carrying cradle having two wheels adjacent the front or lifting edge thereof, and a single wheel at the rear of the cradle. Preferably, the cradle is curved so that rolls or other cylindrical articles to be carried will fit thereon correctly. In the case of cylindrical articles, the cradle should have the same curvature or a curvature with a radius greater than the article.

The front wheels of the truck are mounted in relation to the lifting edge of the cradle so as to serve as a fulcrum and lever arrangement in conjunction with the truck handle, the handle being the long arm of the lever. The handle extends rearwardly and upwardly from the rear end of the cradle or a handle supporting arrangement extending rearwardly from the cradle.

When the cradle is tipped up and the forward edge placed under or adjacent the article to be lifted, a holding means located on the truck, preferably the handle, can be engaged with the article. Then when the handle is moved downwardly, the truck will act as a lever and in cooperation with the holding means will cause the roll or article to be properly lifted from the surface on which it rests on to the cradle.

In the preferred arrangement of the invention, the article engaging means is pivotally mounted on the handle and is operable by a screw and nut arrangement, said screw and nut arrangement being self-locking so that the article engaging means will remain in any position in which it is moved thereby. The article engaging means should have a curved front portion extending beyond the center of gravity of the article to be lifted. It is, of course, to be understood that article engaging means having various shapes corresponding to the articles to be transferred can be used.

The cradle and handle supporting arrangement can have a rearwardly extending downwardly curved portion arranged so that the operator can place his foot thereon when the truck is in an article lifting or tilted position, so as to facilitate tilting of the truck to its level or article transporting position in the action of loading the article onto the truck.

In one form of the invention, a raisable platform can be mounted in or on the cradle for the purpose of elevating an article on the cradle when such is desirable for unloading purposes. The platform can be raised and lowered by various mechanical or hydraulic means, such as a scissors-type jack arrangement.

These and other objects, features and advantages of the invention will become apparent from the following description and drawings which are merely exemplary.

Figure 1 is a side view showing the truck in a tilted or article lifting position ready for movement to a transporting or normal position so that the roll will be lifted onto the truck cradle from the floor or ground.

Figure 2 is a side view of the truck similar to Figure 1 with the roll in transporting position on the platform.

Figure 3 is an enlarged view, partially in section, of the article engaging arm operating mechanism.

Figure 4 is a sectional view taken along the line 4—4 of Figure 3.

Figure 5 is an enlarged sectional view taken along the line 5—5 of Figure 4.

Figure 6 shows a plan view of the device.

Figure 7 is a fragmentary plan view of a modified form of the truck.

Figure 8 is a side view with a portion thereof in section taken along the line 8—8 of Figure 7.

Figure 9 is a fragmentary perspective view of the lifting jack shown in Figures 7 and 8.

Figure 10 is a fragmentary plan view of another modification of the invention.

Figure 11 is a sectional view taken along the line 11—11 of Figure 10.

The device will be described particularly in conjunction with the transportation of a cylindrical article, such as a roll of paper, although as mentioned previously, it is to be distinctly understood that various shaped articles may be transported.

In Figure 1, the truck is shown in a tilted or article lifting position wherein the front edge 9 of the cradle 11 has been inserted under the edge of roll 10. Cradle 11 may be made from sheet metal and have a pair of front rolls 12 (Figs. 1, 2 and 6), the rolls being arranged relative to the front edge 9 so as to gain the proper leverage in the lifting or loading of the article from the floor or ground 8 onto cradle 11. It is to be noted that the rolls 12 serve as the fulcrum for the lever action. At the rear of the cradle or extension thereof, roll 13 is mounted on support 14 carried by a cradle extension or bracket 15. The cradle extension or bracket 15 has handle 16 connected thereto by means of socket 17.

Handle 16 may be formed from a piece of tubular material, or may be solid, and can have a transverse handle 16a at one end thereof.

Article engaging arm 18 can have a transverse extending member 19 (Figs. 2 and 6) arranged so as to properly grasp the roll or article. The curvature of the outer end of the article engaging arm can be made so that it will properly cooperate with the articles to be lifted and held on the cradle.

Article engaging arm 18 is pivoted at 19a to a bracket 20 located on handle 16. The article engaging arm 18 is positioned relative to the cradle or article thereon by the link 21 pivotally connected at 22 to the article engaging arm 18. Arm 21 can have a U-shaped extension 23 for the purpose of straddling the handle 16. The U-shaped portion 23 is connected by means of pivot elements 24 with the operating nut 25 (Figs. 4 and 5). Operating nut 25 is slidable along the guide 26, said guide or bracket being fastened to the handle in any suitable manner. Bracket 26 rotatably supports a screw-threaded member 28 by means of a suitable bearing 29 in the member 30 on bracket 26 and collar 31 at the outer end of said bracket 26 so as to facilitate turning thereof.

When the handle is turned, the nut 25 will be caused to travel to the right or left in accordance with the rotation of handle 32 so as to raise or lower the article engaging arm 18 through movement of the operating link 21. It is evident that the threads of the element 28 and nut 25 may be made such that the nut 25 will remain wherever it is set and thus the arrangement is self-locking.

In the operation of the device, the truck is tilted to the lifting position of Figure 1 and the edge 9 inserted under the article, the article engaging arm 18 being suitably positioned to permit this to be done. The article engaging arm 18 is then moved to the position shown in Figure 1, it being noted that said arm is arranged so that it is beyond the center of gravity of article 10.

The operator then grasps handle 16a and moves the handle downwardly to the position shown in Figure 2. As this movement takes place, the article will roll on to cradle 11. If desired, the handle 32 can then be further operated so as to more firmly grasp the roll 10 on the cradle 11. In the tilting of the truck to a horizontal or transporting position such as seen in Figure 2, the curved section 27 of extension 15 provides a rest for operator's foot so as to assist in the lifting operation of the article from the floor to the cradle.

By use of the three wheel construction shown, the truck is easily maneuverable, even with a heavy article thereon. The front rolls can be arranged in such a manner relative to the lever arms involved so as to require the minimum of effort on the part of the operator in lifting an article from the floor onto the cradle. The fact that the cradle is curved will provide easy handling of the roll with little danger of damage thereto, particularly, because the curved cradle can be related to the curvature of the article engaging arm so as to eliminate danger of damage to the roll.

By using the threaded screw and nut arrangement, the article engaging arm is positively positioned and held at said position which will eliminate danger of the arm slipping and damaging the roll. This is of particular importance because the article engaging arm cannot slip or change position during the loading, transporting or unloading of the roll. Also the screw can be used to assist in loading the roll onto the cradle because the outer end of the arm is upon the center of gravity of the roll.

In the use of the present device it sometimes becomes desirable to be able to raise an article on the cradle to a position above the cradle so as to facilitate unloading of an article onto a higher surface. In order to accomplish this result, the cradle may have a vertically movable cut-out portion or platform with a raising and lowering means therefor. The raising and lowering means can, for example, take the form of a jack which may be called a "scissors" jack. The jack is operable by a crank attached to the truck handle.

Referring to Figures 7 and 8, the article on the cradle is indicated by the dash-dot lines at 35, the article center being shown at 36 (Fig. 8). The curved cradle 37 is similar to that described for Figures 1 and 2 with the exception that a raisable portion 38 may be located as shown. The bracket 39 can be suitably connected to the bottom of the cradle 37 for the purpose of supporting the lower joint of the jack 40. The jack can have four arms 41 pivotally connected at 42, 43, 44 and 45 (Fig. 9). Threaded element 46 has oppositely directed threads at each end portion thereof engageable with nuts 47, 48 respectively. When the threaded element 46 is turned in one direction, it is apparent that the nuts 47 and 48 will be moved toward or away from each other so as to cause movement of the pivot points 42 and 43 relative to each other in a direction at right angles to the movement of the nuts relative to each other. The threaded element 46 may be operated by shaft 59 connected to threaded element 46 through universal joint 60, a crank handle 49 being provided for turning the threaded element 46. The shaft 59 is arranged off-center so as to pass by the article engaging arm operator 50, said article engaging arm operator 50 being similar to that shown in Figures 1 and 2. The article engaging arm is seen at 51 pivotally engaged with truck handle 52 at 53. The line 54 passing through the pivot points 42 and 43 of the jack preferably is arranged so that it will fall to the rear of the center 36 of an article placed on the cradle. The reason for this is that as the article is raised, it will be moved so that it will not tend to fall off of the front part of the cradle. This is particularly useful if the article engaging arm 51 has been moved upwardly and clear of an article on the cradle for the raising operation. The threaded element 46 may have stop nuts 54 suitably located thereon to limit the movement of the jack element as desired.

It is apparent that the jack and associated parts may take various forms and that different types of operators for the jack can be used, such as, for example, a hydraulic cylinder arrangement.

In Figures 10 and 11 will be seen another arrangement of the supporting wheels for the cradle, wherein the cradle 55 is supported on wheels 56, 56, said wheels being carried by the drop axle 57. Suitable guards 58 can be attached or made integral with the platform so as to guard the wheels and also serve to center an article as it is placed on the cradle, the guard being suitably curved for this purpose.

As mentioned previously, it is obvious that various shaped cradles can be used in conjunction with various shapes of article engaging arms and that the invention is not limited to the particular form shown. It is also apparent that various details of construction can be changed without departing from the spirit of the invention except as defined in the appended claims.

I claim:

1. In a hand truck or the like, adapted to carry cylindrical articles or the like, the combination comprising a curved cradle for receiving said article, a pair of wheels mounted underneath said curved cradle adjacent the front edge thereof, a wheel adjacent the rear part of said cradle, a handle extending upwardly and rearwardly relative to said cradle, a foot engaging portion extending rearwardly from said cradle useable for assisting in placing the platform under the edge of an article and lifting the article onto the cradle, and a forwardly extending article engaging arm with an article engaging surface, said arm being pivotally mounted on said handle with a self-locking screw and nut arrangement attached thereto adjustably spacedly positioning the bearing surface of said article engaging means relative to said cradle.

2. In a hand truck or the like, adapted to handle cylindrical articles or the like, the combination comprising a cradle for receiving said article, wheels for said truck, a handle extending upwardly and rearwardly relative to said cradle, an adjustable article engaging arm having an article engaging portion extending forwardly over said cradle engageable with an article on said cradle, and a self-locking screw and nut mechanism connecting said article engaging arm and said truck for adjustably spacedly positively positioning said article engaging arm bearing surface over said cradle.

3. In a hand truck or the like adapted to handle cylindrical articles, the combination comprising a curved cradle for receiving an article on said truck, wheels for said cradle, a handle extending upwardly and rearwardly relative to said cradle, a raisable platform on said truck inserted in said cradle and movable relative thereto, and means raising and lowering said platform relative to the cradle so that an article on said cradle can be raised above the cradle.

4. In a hand truck or the like adapted to handle cylindrical articles, the combination comprising a cradle for receiving an article, wheels for said truck, a movable platform raisable relative to said cradle, means connected to said platform for raising and lowering said platform, an adjustable article engaging arm having an article engaging bearing surface extending forwardly over said cradle and engageable with an article on said cradle, and an adjustable self-locking arm positioning means connected between said arm and truck for positively positioning said arm relative to the cradle.

5. In a hand truck or the like adapted to handle cylindrical articles or the like, the combination comprising a cradle for receiving said article on said truck, wheels for said truck, a handle extending upwardly and rearwardly relative to said cradle, a movable platform raisable relative to said cradle, an elevating means connected between said raisable platform and said truck, said elevating means comprising four pivoted links, said links forming a parallelogram with opposite apices connected between said cradle and platform respectively, the other pair of opposite apices being connected with a threaded element having oppositely directed threads, and means for turning said threaded element so as to raise and lower said platform relative to said cradle.

6. In a hand truck or the like adapted to handle cylindrical articles or the like, the combination comprising a cradle for receiving said article on the truck, wheels for said truck, a handle extending upwardly and rearwardly relative to said cradle, a movable platform raisable relative to said cradle, an elevating means connected between said platform and said cradle, said elevating means comprising four pivoted links, said links forming a parallelogram with opposite apices connected between said cradle and platform respectively, the other pair of opposite apices being connnected with a threaded element having oppositely directed threads, an adjustable article engaging arm extending forwardly over said cradle and engageable with an article on said cradle, and a self-locking screw and nut mechanism connecting said article engaging arm and said truck for positively adjustably positioning said article engaging arm relative to said cradle.

7. In a hand truck or the like adapted to carry cylindrical articles or the like, the combination comprising a curved cradle for receiving an article, a pair of wheels mounted underneath said curved cradle adjacent the front edge thereof, a wheel adjacent the rear part of said cradle, a handle extending upwardly and rearwardly relative to said cradle, a foot engaging portion extending rearwardly from said cradle useable for assisting in placing the cradle under the edge of an article and lifting the article onto the cradle, a platform raisable relative to said cradle for lifting an article above said cradle, means connected to said platform for raising and lowering said platform, an adjustable article engaging arm having an article bearing surface extending forwardly over said cradle and engageable with an article on said cradle, and a self-locking screw and nut arm positioning means connected between said handle and said arm predeterminedly spacedly positioning said bearing surface over the cradle.

8. In a hand truck or the like adapted to handle cylindrical articles or the like, the combination comprising a cradle for receiving said article on said truck, wheels for said truck, a handle extending upwardly and rearwardly relative to said cradle, a movable platform raisable relative to said cradle for raising and lowering an article relative thereto, an elevating means connected between said platform and said truck, said elevating means comprising four pivoted links, said links forming a parallelogram with opposite apices connected between said cradle and platform respectively, means connected to said links changing relative angularity of said parallelogram for raising and lowering said platform relative to said cradle.

THOMAS B. CHAMBERS, Jr

REFERENCES CITED

The following references are of record in the file of this patent:

UNITED STATES PATENTS

| Number | Name | Date |
|---|---|---|
| 771,804 | Blomquist | Oct. 11, 1904 |
| 1,012,139 | King | Dec. 19, 1911 |
| 1,155,235 | Harvey et al. | Sept. 28, 1915 |
| 1,431,630 | Cade | Oct. 10, 1922 |
| 2,301,579 | Plant et al. | Nov. 10, 1942 |
| 2,418,522 | Needham | Apr. 8, 1947 |
| 2,506,471 | Siegal | May 2, 1950 |
| 2,514,825 | Zenko | July 11, 1950 |